Patented Sept. 11, 1928.

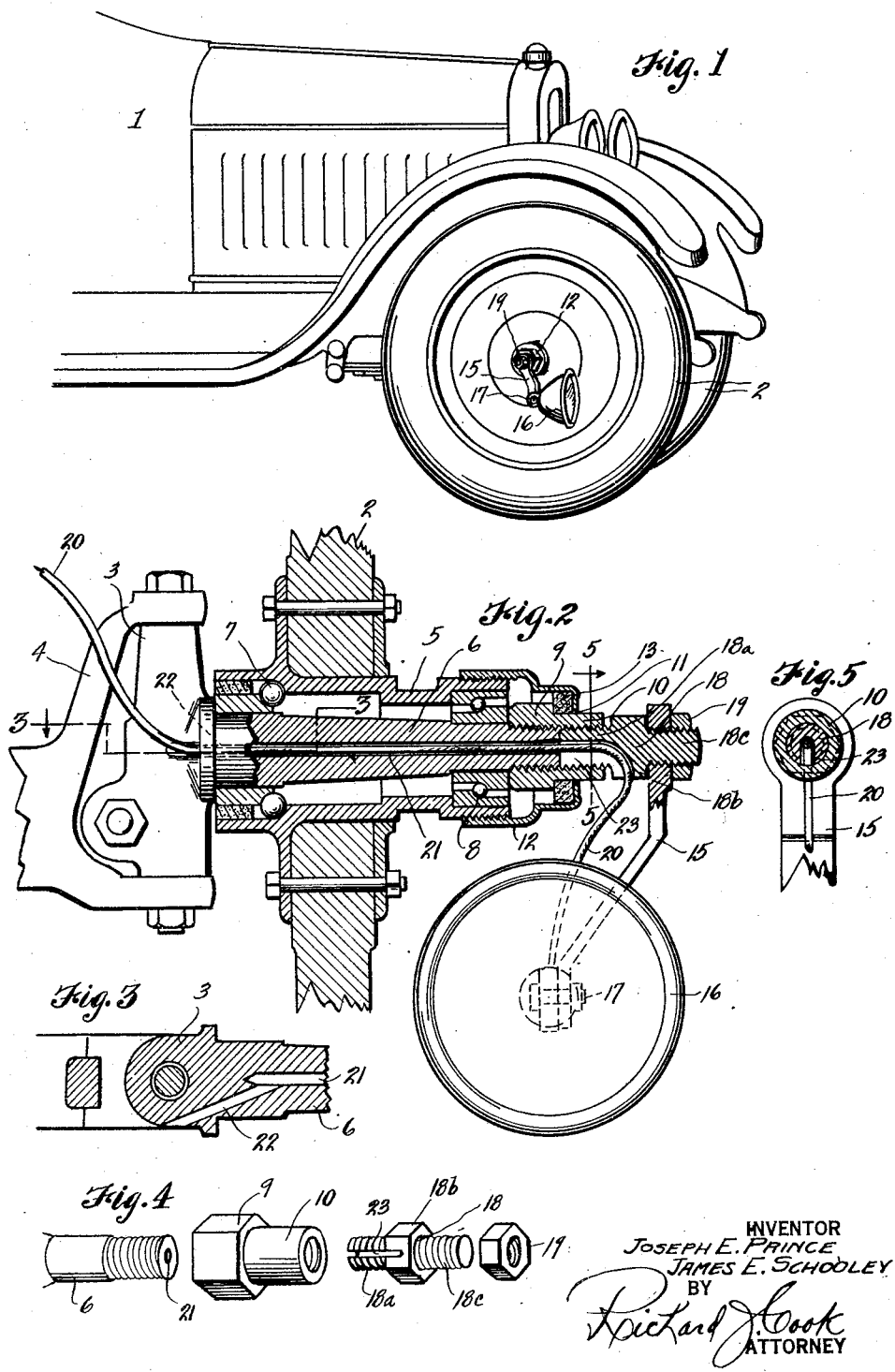

1,683,915

UNITED STATES PATENT OFFICE.

JOSEPH E. PRINCE AND JAMES E. SCHOOLEY, OF SEATTLE, WASHINGTON.

SPOTLIGHT-MOUNTING DEVICE.

Application filed August 9, 1926. Serial No. 128,194.

This invention relates to improvements in spotlight mounting devices for automobiles and similar types of motor vehicles; more particularly the invention relates to devices of that character adapted to support a spotlight from the spindle of a steering wheel of the vehicle and at the outside of the wheel.

It is the principal object of this invention to provide a dirigible spot light mounting in the form of a tubular nut that may be threaded onto the spindle end to serve the purpose of the usual wheel retaining nut and into which a mounting shank for a spotlight bracket, or arm, may be threaded and tightened against the end of the spindle so as to serve additionally as a lock for the nut.

A further object resides in the provision of a channel or bore longitudinally of the wheel spindle through which a circuit wire may be extended to the spot light.

Another object is to provide a mounting whereby vibration and looseness of the lamp bracket may be avoided.

Other objects reside in the various details of construction and combination of parts hereinafter described.

In accomplishing these and other objects, we have provided the improved details of construction, the preferred forms of which are illustrated in the accompanying drawings, wherein—

Figure 1 is a perspective view of an automobile equipped with a spot light in accordance with the present invention.

Figure 2 is a sectional view through the wheel hub and spindle, illustrating the construction and mode of application of a spindle attachment embodied by this invention.

Figure 3 is a sectional detail taken horizontally on the line 3—3 in Figure 2.

Figure 4 is a perspective view of the lamp bracket mounting parts, shown in disassembled relation.

Figure 5 is a vertical section transversely of the spindle, taken on the line 5—5 in Figure 2.

Referring more in detail to the drawings—

1 designates an automobile, which may be one of any of the usual types of construction, having its front, steering wheels 2 carried by knuckles 3 pivotally mounted in yokes 4 at the ends of the front axle; the wheels having their hubs 5 rotatable about spindles 6 on suitable anti-friction bearings, as indicated at 7 and 8.

Threaded onto the outer end of a spindle 6 and seated against the outer ring of bearings 8 is a nut 9, embodying a part of the present invention, and which, in use, replaces the usual retaining nut used in this place and serves in its stead to retain the wheel on the spindle. This nut has a reduced, cylindrical extension 10, coaxial of the spindle, that extends outwardly beyond the end of the spindle and through an opening 11 provided therefor in the end of the hub cap 12, a packing washer 13 is fitted between the nut 9 and end of the hub cap so as to prevent leakage of oil or grease from about the shank 10.

Supported by means of a bracket, or arm, 15, adjacent the outside of the wheel and below the wheel hub, is a spot light 16. The lower end of the bracket is attached adjustably to the lamp housing by means of a bolt 17 and its upper end is attached to the spindle 6 by means of a shank designated in its entirety by reference numeral 18. This shank 18 has a threaded inner end portion $18^a$ adapted to be threaded into the tubular shank 10 of nut 9 against the inner end of the spindle, a central nut $18^b$ to which a wrench may be applied to tighten it in place and an outer end shank $18^c$ over which the upper, apertured end of bracket 15 is disposed and clamped by a nut 19 threaded onto the outer end of shank $18^c$.

While we have shown the bracket 15 depending downwardly, it is readily apparent that it may be extended in various directions about the hub to suit its purpose.

In order that a circuit wire, as designated at 20, may be extended to the lamp without necessitating its being extended along the outside of the wheel, we have provided a central bore or channel 21 inwardly from the outer end and have there connected it with a lateral bore 22 opening to one side of the spindle, as shown best in Figure 3. The shank 18 is also provided at its inner end with a laterally opening slot 23 that communicates with the outer end of the channel 21. The wire 20 leads from a source of electricity, not shown, through the spindle channels 22, 21 and shank slot 23 to the lamp and is, in this way, protected while at the same time is entirely out of the way and free of danger of catching on objects in passing.

It is readily apparent that by the provision of the nut $18^b$ on shank 18, the latter may be tightened against the end of the spindle so as to serve as a lock for preventing unthreading of nut 9 as well as preventing its own unthreading. Then, by securely tightening the nut 19 on shank 18ᵉ the lamp bracket will be held perfectly firm and secure against vibration or looseness incidental to rough travel.

It is further apparent that the spot light may, by directing the arm 15 inwardly, be located entirely within the vertical plane of the outer end of the hub cap and will be disposed out of the way and in no danger of being brushed off in passing or by passing objects.

Having thus described our invention, what we claim as new therein and desire to secure by Letters-Patent, is:

1. In a vehicle of the character described, the combination with a steering wheel spindle and a wheel on the spindle provided with a hub cap having an opening therein alined with the spindle, of a nut threaded onto the outer end of the spindle for retaining the wheel and provided with a tubular extension projecting through the hub cap opening, a shank threaded into the extension against the end of the spindle and serving as a lock for the nut, a lamp supporting bracket mounted on the outer end of the shank and a spot light supported by the bracket.

2. In a vehicle of the character described, a steering wheel spindle, a wheel revoluble on the spindle provided with a hub cap having an opening therein alined with the spindle, a nut threaded onto the outer end of the spindle for retaining the wheel and provided with a tubular extension projecting through the hub cap opening, a shank threaded into the said extension against the end of the spindle to serve as a lock for the nut; said shank having a wrench head integral therewith intermediate its ends whereby it may be threaded and tightened in the extension and having a threaded outer end, a lamp mounting bracket mounted on said outer end, a nut threaded onto said end to clamp the bracket in place against the wrench head and a spot light mounted by the bracket; said spindle being provided with a longitudinal channel and said shank having a laterally opening slot communicating therewith through which a circuit wire may be extended to the lamp.

Signed at Seattle, Washington, this 29th day of March, 1926.

JOSEPH E. PRINCE.
JAMES E. SCHOOLEY.